United States Patent [19]

Gounder

[11] Patent Number: 4,682,744
[45] Date of Patent: Jul. 28, 1987

[54] SPACECRAFT STRUCTURE

[75] Inventor: Raj N. Gounder, Robbinsville, N.J.

[73] Assignee: RCA Corporation, Princeton, N.J.

[21] Appl. No.: 720,941

[22] Filed: Apr. 8, 1985

[51] Int. Cl.[4] ................................................. B64G 1/10
[52] U.S. Cl. .............................. 244/158 R; 244/172; 244/133
[58] Field of Search ................... 244/158 R, 159, 160, 244/162, 172, 133

[56] References Cited

U.S. PATENT DOCUMENTS 3,311,323  3/1967  Cappel ............................... 244/160
3,333,788  8/1967  Dryden ........................... 244/158 R

FOREIGN PATENT DOCUMENTS 2753188  6/1978  Fed. Rep. of Germany .
1496990 10/1967  France ............................... 244/172

OTHER PUBLICATIONS

AVCO Specialty Materials Division Catalog Sheets on Silicon Carbide Composite Materials, Boron Composite Materials, Fire Protection Materials, and Graphite Materials, Apr., 1981.
"Metal-Matrix Composites Application/Payoff for High-Performance Aircraft Airframes," by Brian T. Gannon et al., *Air Force Final Report* No. AFWAL--TR-81-3018, May 1980-Feb. 1981, pp. 1-138, Mar. 1981.
"Materials, Processing & Applications for AVCO Metal Matrix Composites," presented to 28th *National SAMPE Symposium*, Anaheim, Calif., Apr. 13, 1983.
"SiC Reinforcements for Aluminum Matrix Composites," *Fiber Materials*, Inc.
"Static and Fatigue Testing of 2024 Al-SiC (F-9) T-4," by G. J. Dvorak et al., *ASME Winter Annual Meeting*, Nov. 14-19, 1982, pp. 1-7.
"Hot-Rolled Silicon Carbide-Aluminum Composites," by T. G. Nieh et al., *J. of Materials Science Letters* 2 (1983), pp. 119-122.
"The Department of Defense Metal-Matrix Composite Thrust Program-Five Years Later," *J. Persh*, Staff Speciality for Materials and Structures.
"Metal Matrix Composites: An Overview," by S. W. Bradstreet, presented at the 28th National SAMPE Convention, 1983, pp. 1-10.
"Metal-Matrix Composite Materials & Processes: Recent Developments with DWA1 20," by J. F. Dolowy et al., presented at the 28th *National SAMPE Symposium*, Anaheim, Calif., Apr. 13, 1983.
"Metal Matrix Composite for Strategic Aircraft," by J. W. Ellis, presented at the 28th National SAMPE Symposium/Exhibition, Anaheim, Calif., Apr. 12-14, 1983, pp. 1-19.
"Metal Matrix Composites," (Materials Concepts, Inc.), Fiber Materials, Inc.
"Metal Matrix Composites for Aircraft Engines," by Robert A. Signorelli, NASA Technical Memorandum 83379, prepared for the 28th National SAMPE Symposium, Anaheim, Calif., Apr. 12-14, 1983.
"DWA Composite Specialties, Inc. Where Concepts Become Realities," DWA1 20 Update.
"Results of Recent MMC Joining Investigations," *DOD Metal Matrix Composites Information Analysis Center Current Highlights*, vol. 3, No. 3, Sep. 1983.

*Primary Examiner*—Sherman D. Basinger
*Assistant Examiner*—Rodney Corl
*Attorney, Agent, or Firm*—Clement A. Berard, Jr.; Robert L. Troike

[57] ABSTRACT

A tubular circular cylindrical member, an attached frustro-conical member, and attached annular stiffening rings are formed of a metal matrix composite (MMC) material such as SiC/Al. The combined cylindrical and conical structure has a tapered wall thickness which reaches a maximum value at the point nearest the attachment of the structure to its launch vehicle. The entire structure and rings are quasi-isotropic, have a homogeneous microstructure, are low in weight, high in strength and stiffness, and are thermally stable with minimum distortion due to exposure to thermal cycling.

10 Claims, 5 Drawing Figures

SPACECRAFT STRUCTURE

This invention relates to a structural arrangement for an earth orbiting spacecraft.

A spacecraft structure supports the engine and thrusters used to operate the spacecraft in orbit and supports the payload equipment. The payload equipment can include relatively large antenna reflectors of the type employed in communication satellites, earth sensors, navigation sensors, and other devices for precisely orienting the spacecraft. This equipment requires a rigid support structure with extremely stable characteristics to withstand a number of environmentally induced stresses.

By way of example, during initial launch the spacecraft must withstand the relatively high stresses induced by the launch acceleration. These stresses are compounded by the attachment of the relatively heavy engine and payload equipment to the support structure. Once in orbit, the spacecraft structure is exposed to thermal cycling in which the temperature usually varies in a range of at least ±100° C.

In U.S. Pat. No. 4,009,851 there is described a spacecraft structural arrangement comprising an aluminum alloy sheet member that is riveted, welded, or otherwise fastened at an edge thereof to form an elongated cylindrical member. The cylindrical member is made extremely stiff by a plurality of longitudinally extending ribs spaced in a parallel arrangement around the periphery of the cylindrical member and further includes a plurality of annular stiffening ribs.

Secured to the lower end of the cylindrical member is a frustro-conical member which is constructed similarly as the cylindrical member. As disclosed, the frustroconical member also has a plurality of longitudinally extending ribs spaced around its external surface. The ribs are attached by rivets to the cylindrical and frustroconical members. The use of rivets to secure the ribs to the cylindrical frustro-conical members requires flanges to which the rivets are attached which add to the structure's weight.

The support structure is disclosed as being lighter than prior art support structures, however, it is desirable to further minimize its weight in order to permit additional payload for increased cost effectiveness. The amount of payload carried by a spacecraft is limited to the combined payload-support structure-engine and support system weight, the greater the support structure weight the smaller the payload weight for a given spacecraft size.

A spacecraft construction in accordance with the present invention is adapted to be attached to a launch vehicle and comprises a tubular cylindrical structure and a tubular frustro-conical structure continuous with and extending from the cylindrical structure. These structures have aligned longitudinal axes. The structures are adapted to receive a spacecraft payload and an engine and comprise a continuous homogeneous microstructure formed of reinforcing fibers in a metal matrix. The structures' microstructure has a wall thickness which increases in the region from the extended end of the cylindrical structure remote from the frustro-conical structure to the extended edge of the conical structure remote from the cylindrical structure, the edge at the thickest wall end being adapted to be attached to the launch vehicle.

Figure 3:
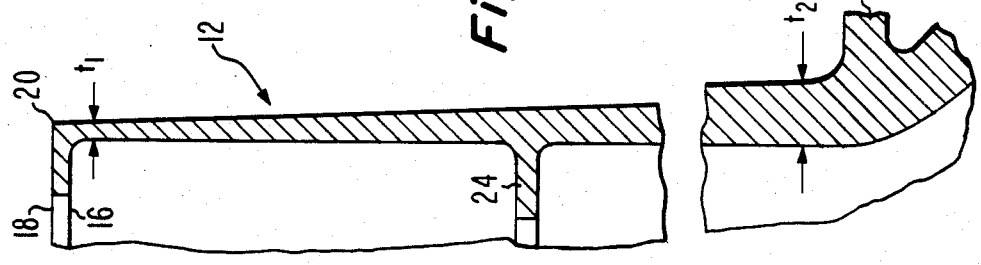
Figure 2:
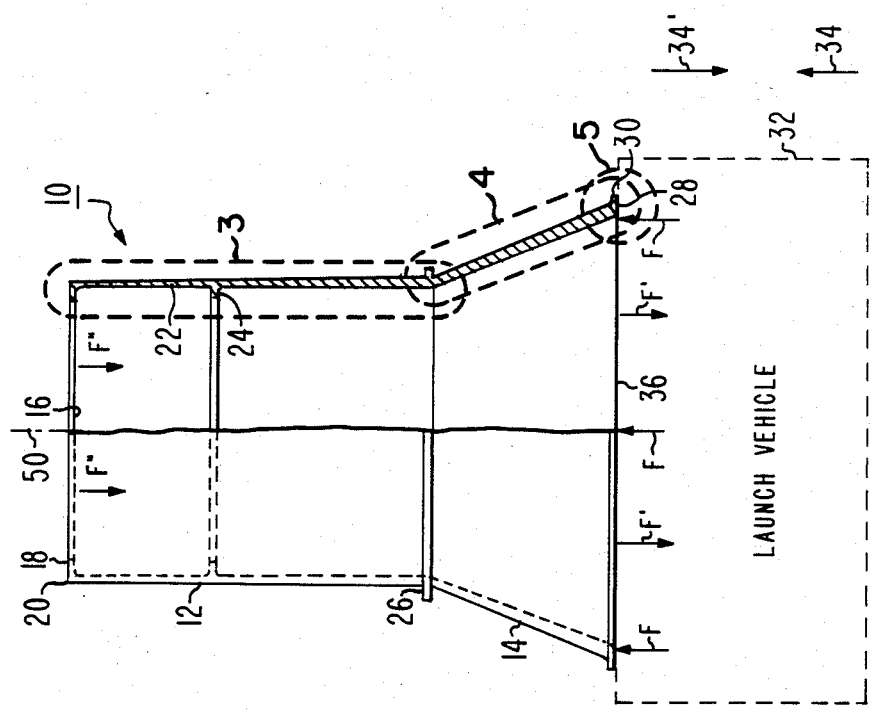
FIG. 2 is a sectional view of the spacecraft supporting structure employed in the embodiment of FIG. 1.
Figure 4:
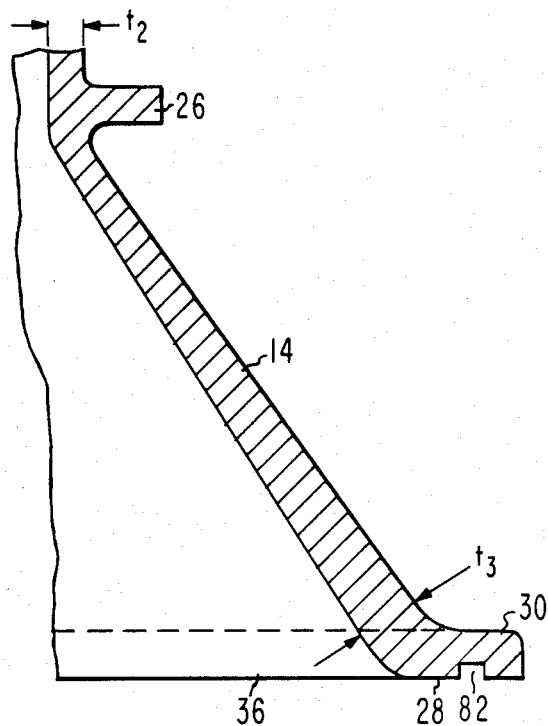
Figure 5:
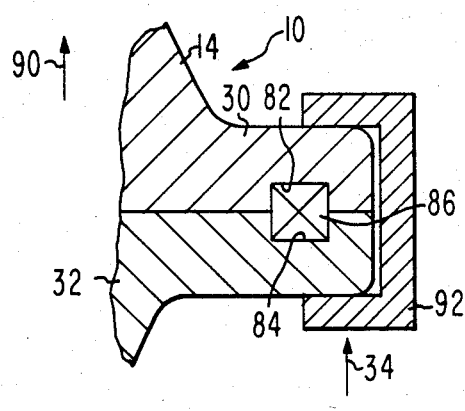

FIGS. 3 and 4 are sectional views of the walls of the structure of FIG. 2 showing, in more detail, the regions encircled in dashed line 3 and 4, respectively, of FIG. 2; and FIG. 5 is a more detailed sectional view taken in the region encircled by dashed line 5 of FIG. 2 to illustrate the attachment of the spacecraft structure of FIG. 2 to a launch vehicle.

Figure 1:
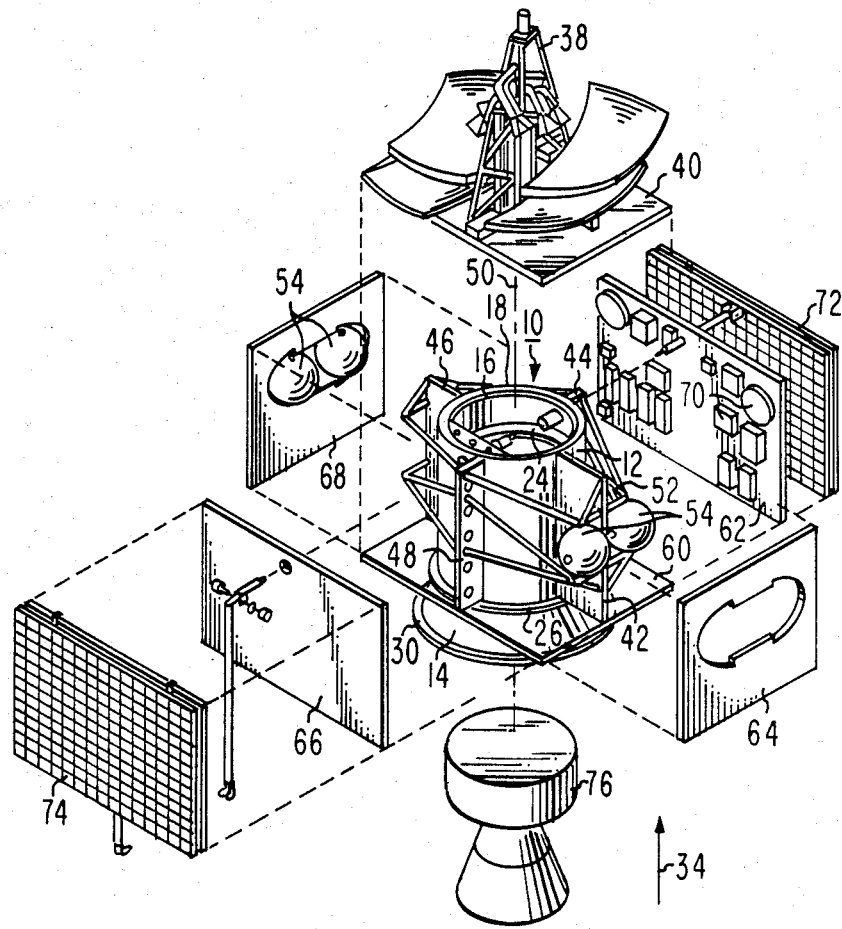
FIG. 1 is an exploded isometric view of an embodiment of the present invention.

In FIG. 1, a spacecraft includes a support structure 10 which comprises a right circular cylindrical member 12 to which is attached an outwardly flared frustro-conical member 14 to form a unitary structure as shown in more detail in FIG. 2. The support structure has a longitudinal axis 50 which is the aligned axis of members 12 and 14.

In FIG. 2, the support structure 10 includes an annular inner rib or stiffening flange-like ring 16 having an exterior plane surface 18 which is coplanar with the extended edge 20 of the cylindrical member 12. Secured to member 12 internal surface 22 is an annular internal rib or flange-like ring 24. Secured at the interface between member 12 and member 14 is an outer annular rib or flange-like ring 26. Secured to the lower extended edge 28 of member 14 is annular stiffening rib or flange-like ring 30 having an outer plane surface 36. The members 12 and 14 and rings 16, 24, 26, and 30 comprise a unitary integral homogeneous microstructure comprising a reinforcing fiber in a metal matrix forming a composite metal matrix structure having no rivets or weld joints between any of the elements.

A metal matrix composite (MMC) is a material consisting of any combination of fibers, whiskers or particulates bound together by a metal. The term "fibers" as used in the claims is intended to include fibers, whiskers, and particulates. The reinforcement material can be either continuous or discontinuous. The continuous fiber composite uses continuous fibers to reinforce the metal. The resulting composite properties tend to be directional and fairly predictable via the well-known rule of mixture (matrix/reinforcement) calculations. The discontinuous fiber composite uses chopped short fibers, whiskers or particulates to reinforce the metal. The resulting composite properties are fairly isotropic but with a somewhat less dramatic enhancement of the matrix properties. Typical metallic systems employed as the binding material include aluminum, magnesium, titanium, copper, lead and steel. Typical continuous fiber reinforcements are graphite, silicon carbide, boron, boron carbide, aluminum oxide, steel and tungsten. Typical discontinuous reinforcements include the above continuous fibers chopped into short segments, silicon carbide whiskers, silicon carbide particulates and alumina particulates. These materials are described, by way of example, in more detail in a publication of Avco Corporation, publication number 0481-(page number)-2M.

In the present embodiment the metal matrix composite material comprises silicon carbide in an aluminum matrix. Silicon carbide materials are described in the Avco Catalog 0481-16-2M and 0481-20-2M. As described therein, silicon carbide has the advantages of low cost, high strength, high heat resistance up to 1,200° C., low electrical conductivity, corrosion resistance and chemical stability, and wettabiity for metals.

Aluminum composites are fabricated by casting and hot molding in processes known as hot isostatic pressing which will be described below. Mechanical properties of a metal matrix composite comprising particulate silicon carbide in combination with aluminum as produced by DWA Corporation is given in Table 1 in an article entitled "Results of Recent MMC Joining Investigations," *DOD Metal Matrix Composites Information Analysis Center-Current Highlights,* Sept. 1983, Vol. 3, No. 3 and in a report prepared by Rockwell International dated Nov. 1980, Report No. AFWAL-TR-81-3018, entitled "Metal-Matrix Composites Application/Payoff for High-Performance Aircraft Airframes." This report includes a survey of MMC material suppliers and the published literature made to gather physical properties, data, and cost using developing design concepts employing MMC materials.

The structure of FIG. 2, may comprise silicon carbide particulate/AL (T6061) having a fiber volume content of about 25% and a porosity of less than 1%. A number of known processes may be employed to fabricate the structure. One is the hot isostatic press process mentioned above in which the powdered metal and particulate reinforcement material is first thoroughly mixed to uniformly distribute the particles throughout the metal powder. The combined materials are then compressed at elevated temperatures under high pressure and molded to rough dimensions. By way of example, the mold may comprise, in one form, an inner mandrel and a movable outer mandrel. The cavity between the mandrels defines the shape to be formed. The reinforcement material and metal matrix material in powder form is placed in the cavity between the mandrels. The temperature is raised and the outer mandrel is moved radially inwardly to compress the matrix composite material. The heat and pressure melts the metal powder. Upon cooling the mandrels are separated and the ingot so formed comprising the MMC product is released. Elements made of MMC material may be attached to the ingot in a known diffusion process or molded therewith.

The hot isostatic pressing process densifies the powdered reinforcing fibers and metal composite material under extremely high pressures until the materials melt and form the final shape and material composition. This is shown, for example, by a publication of FMI Corporation for silicon carbide composite materials in an aluminum powder matrix.

One process to produce the structure of FIG. 2 may employ an extruded tube of the desired MMC composition and then internal roll spinning the tube end to form the frustro-conical portion with the material undergoing tensile stresses. A second process employs an extruded tube in which the flared portion is created by reducing the diameter of the cylindrical tube by external roll spinning. This process places the material under continuous compression. A third process includes an extruded forging of the desired product. A fourth and preferred process includes hot spinning the conical portion and then joining the conical portion to an extruded circular cylindrical tube by inertia welding.

Inertia welding is a technique in which the microstructure of the connection of the flared frustro-conical portion to the circular cylindrical portion is made uniform with the remainder material. The weld joint is not separately identifiable in the microstructure which is substantially homogeneous. The inertia weld technique is proprietary to DWA Corporation of Chatsworth, Calif. In all of the above processes, the resultant structure has oversize dimensions and the final dimensions of the finished product including the annular rings are machined from the rough dimensions.

The resultant metal matrix composite structure is quasi-isotropic due to the uniform distribution of the reinforcing material particulates or fibers in the metal matrix. The term "quasi-isotropic" means that all elements of the material in a region extending radially from a given element in any angular segment about that element respond uniformly to any applied mechanical or thermal loadings. Thus, for example, the thermal expansions and contractions are uniform throughout the structure in response to a given thermal gradient applied to the material. This quasi-isotropic property minimizes thermally caused stresses and resultant structure distortions in the presence of wide thermal excursions.

The payload, engines, and so forth attached to structure 10 are shown in FIG. 1. A plurality of sheet-like bulkhead members 42, 44, 46, and 48 are attached to structure 14 parallel to longitudinal axis 50. The plane of bulkhead members 42, 46 may be at right angles to the plane of members 44, 48. The members 44 and 48 are coplanar and the members 42 and 46 may lie in spaced planes offset from axis 50. A strut structure 52 is attached to the bulkheads and secures fuel tanks 54 to the support structure 10.

In FIG. 1, antenna 38 is attached to planar panel 40. This panel is secured to ring 16 at surface 18. A second planar panel 60 is attached to ring 26 parallel to panel 40. Panels 62, 64, 66, and 68 are attached to respective bulkheads 44, 42, 48, and 46 and to adjacent ones of the panels at abutting edges thereof. For example, panel 64 is attached to bulkhead 42 at the bulkhead radial distal edge relative to axis 50 and to panels 40, 60, 62, and 66 at respective parallel abutting edges thereof. Panel 66 is parallel to panel 62 and is secured to bulkhead 48, panels 40, 60, 64, and 68. Panel 68 is attached to bulkhead 46 and to panels 40, 60, 62, and 66. The resulting structure is orthorhombic. This structure is described in more detail in the aforementioned U.S. Pat. No. 4,009,851.

Payload elements are attached to the various panels such as elements 70 attached to panel 62. In addition, extendible folded solar array panels 72 and 74 are attached via linkages to the structure 10 as described also in more detail in the aforementioned patent. Apogee kick motor 76, FIG. 1, is attached to internal ring 24, FIG. 2 of structure 10. The apogee kick motor 76 is located fully internal the structure 10.

In FIG. 2, the support structure 10, during launch, is attached to a launch vehicle 32 (shown in dashed line). The launch vehicle 32 is assumed propelled in direction 34 opposite the direction 34' of the force of gravity. The structure 10 is attached to launch vehicle 32 at member 14 surface 36. Acceleration created forces F are exerted by the launch vehicle in direction 34 on structure 10 against the frustro-conical member 14 at surface 36. The forces F represented uniformly distributed forces around the member 14 and are applied to ring 30. The forces F create reaction forces F' in direction 34' opposite direction 34 and proportional to the masses of the structure 10 and its attached payload, kick motor, or engine and other appurtenances.

All of the elements described above in connection with FIG. 1, being secured to the structure 10, tend to produce a number of different reaction forces on the structure 10 as the launch vehicle is accelerated in direction 34. For example, the reaction forces F' of maximum value are produced on the structure 10 at ring 30 and are transferred to the launch vehicle 32. Different reaction forces are created at different points along the length of structure 10 and necessarily increase in magnitude as the distance from a given point on structure 10 and the launch vehicle 32 decreases. That is, rings 30 and th portion of member 14 adjacent rings 30 absorbs and transmits all of the load produced by the launch acceleration induced forces F' of all elements attached to structure 10. In comparison, ring 16 has reaction forces F" which are at a relative minimum value. This is due to the fact ring 16 has the reaction forces of the fewest number of appendages attached thereto as compared to the remaining portion of structure 10. Thus, the launch induced stresses on structure 10 increase in magnitude in direction 34' toward a maximum at ring 30.

A unique feature of the present structure is that it does not employ vertical reinforcing ribs as disclosed in the structure of the above U.S. Pat. No. 4,009,851. To provide additional stiffness to the structure 10, FIG. 2, and to compensate for the minimum force loading on ring 16 and for the maximum force loading on the structure 10 at ring 30 due to the launch induced forces F, the walls of the members 12 and 14 are tapered. The walls are thinnest on member 12 adjacent ring 16 and are thickest on member 14 adjacent ring 30. The tapering stiffens the structure 10 and accommodates the increased loading along the length of structure 10 parallel to axis 50 in direction 34'. As the loading on structure 10 due to the reaction forces increases so does the wall thickness as the walls approach the proximity of the launch vehicle to which the structure 10 is attached.

In FIG. 3, for example, member 12 wall thickness $t_1$ at a location adjacent ring 16 is the thinnest and may be of any value in accordance with the given loading and structural design characteristics of a given spacecraft structure depending, of course, on the number of elements attached to the structure 10 adjacent ring 16. The cylindrical member 12 gradually increases in thickness until the thickness $t_2$ next adjacent the ring 26 is of greater magnitude than the value of the thickness $t_1$. Thickness $t_2$ tapers to an increased thickness $t_3$ of member 14, FIG. 4, adjacent to ring 30 which thickness is a maximum. The actual thickness values of all of the walls $t_1$–$t_3$ may be in accordance with a given implementation.

An important consideration is that the microstructure throughout all of the walls and rings is uniform, homogeneous, and without discontinuities at the joints therebetween. No rivets or other extraneous fastening devices are employed to attach the rings 16, 24, 26, and 30 to the tubular portion of the structure 10. The tapered wall thickness permits a minimum amount of material in the structure 10, minimizing its weight and yet permits maximizing its strength. By way of comparison, a structure similar to that described in the aforementioned U.S. patent comprising aluminum material may have a weight of 84 pounds, whereas a silicon carbide aluminum metal matrix core structure constructed in accordance with the present invention of similar dimensions has a total weight of about 61 pounds employing aluminum T6061, or a total weight of 57 pounds employing aluminum T2024.

The particular location and the number of the rings in the structure described herein is for use with the exemplary spacecraft shown in FIG. 1. These rings serve as both strengthening ribs and as means for attaching the panels 40 and 60, and apogee kick motor 76. The tapered wall thickness allows for the variation in the distribution of the launch forces in structure 10 while maintaining rigidity of the cylindrical frustro-conical combined structure within the requirements of a spacecraft implementation.

In FIG. 5, ring 30 at the lower end of member 12 includes an annular recess 82. The launch vehicle 32 has an annular recess 84 facing recess 82. An ejection mechanism 86 schematically shown in the drawing figure is located in the recesses. The details of the ejection mechanism are well known and are not provided herein. By way of example, the ejection mechanism may comprise spring-loaded rods or similar force creating elements for ejecting the spacecraft structure and its attached appendages in direction 90 away from the launch vehicle 32 at the appropriate time during the launch cycle.

A clamp mechanism 92, which is schematically shown, is released by a pyrotechnic device (not shown) or other release mechanisms. The structure 10 is separated from the launch vehicle 32 in direction 90 in response to the forces exerted by the release mechanism 86. The ring 30 therefore serves an additional function of reinforcing the base portion of the frustro-conical member 12 for receiving the ejection forces.

In the present embodiment, the cylindrical member 12 is a right circular cylinder. However, by the term "tubular cylindrical structure" as employed in the claims, it can also include a slightly tapered structure in which the internal diameter, for example the diameter adjacent ring 16, may be smaller than the internal diameter at ring 26 to produce a somewhat slightly frustro-conical configuration for member 12. Whether or not the cylindrical member 12 is a right circular cylinder or slightly frustro-conical is not as important as the uniform tapering structure of the combined walls of the member 12 and member 14 which increase in thickness as they approach the interface of the structure 10 with the launch vehicle 32.

The particular thickness of the walls or the particular materials in a metal matrix composite structure is not as important as the use of a metal matrix composite material. This material is formed with a uniform homogeneous microstructure including the annular rib structures. This homogeneous structure precludes the use of additional rivets, flanges and other elements for attaching the various structural elements together. The metal matrix composite material results in a spacecraft structure that has a minimum weight, maximum strength, minimum distortion in the presence of thermal cycling, and minimum distortion in response to applied force loads during the launch and during orbit. The metal matrix composite also provides the structure capability to withstand exposures to higher temperature levels than may be possible with conventional metals. Such high temperature environments may be anticipated under certain apogee kick motor soakback conditions (heat transferred from the motor) and space radiation environments.

What is claimed is:

1. A spacecraft construction adapted to be attached to a launch vehicle comprising:
    a tubular cylindrical structure; and
    a tubular frustro-conical structure continuous with and extending from said cylindrical structure, said structures having aligned longitudinal axes;
    said structures being adapted to receive spacecraft payload and engine and comprising a continuous homogeneous microstructure formed of reinforcing fibers in a metal matrix, said microstructure having a wall thickness which increases from the extended end of said cylindrical structure remote from said frustro-conical structure to the extended edge of said conical structure remote from said cylindrical structure, the edge at the thickest wall end being adapted to be attached to said launch vehicle.

2. The construction of claim 1 further including at least one ring member extending from the surface of at least one of said structures, said ring member being part of said homogeneous microstructure.

3. A spacecraft structure comprising:
 a tubular cylindrical member having first and second opposite ends including means adapted to receive an apogee drive engine; and
 a tubular frustro-conical member having respective smaller and larger internal perimeters at third and fourth opposite ends, said internal perimeter dimension at said third end being about the same magnitude as the internal perimeter of the cylindrical member second end, said cylindrical member second end being joined to the conical member third end, the longitudinal axes of said members being aligned, the members forming a continuous, cylindrical tubular structure having a cylindrical portion and a flared conical portion extending from the cylindrical portion and adapted to receive payload elements of a spacecraft;
 said portions including the region at and between the juncture of said second and third ends comprising a continuous homogeneous composite microstructure formed of reinforcing fibers in a metal matrix, said members having a uniform annular wall thickness in any given plane normal to said axes, said wall thickness tapering in increasing magnitude from said first to said fourth ends.

4. The structure of claim 3 wherein said means adapted to receive said engine and said elements includes at least one annular ring member extending from at least one of said members, said at least one ring member including the joint between said ring member and the cylindrical and conical members to which the ring member is joined comprising said homogeneous composite microstructures of said fibers and metal matrix.

5. The structure of claim 4 wherein said at least one ring member comprises a plurality of rings at least one of which is adapted to secure said payload elements to said structure, one ring extending from said first end, a second ring extending from said cylindrical and conical members external thereof at said region where said cylindrical and conical members are joined and a third ring extending from the external surface of said conical member at said fourth end.

6. The structure of claim 5 further including a fourth ring interior of said cylindrical member spaced between said first and second ends, said fourth ring comprising a planar member extending from the interior surface of said cylindrical member and adapted to secure said engine thereto.

7. The structure of claim 3 wherein said cylindrical member and said frustro-conical member are right circular structures.

8. The structure of claim 3 wherein said members consist of SiC particulate reinforcement material in an aluminum matrix.

9. The structure of claim 3 including a plurality of planar bulkhead sheet members secured to and extending from said tubular cylindrical member and lying in planes parallel to said aligned axes.

10. The structure of claim 3 including first and second planar panel elements, said first element being secured to said first end, said second element being secured to said members external thereof at the interface of said members and parallel to the first element.

* * * * *